May 23, 1939.　　　　B. FRIEDMAN　　　　2,159,477
AUTOMOBILE RADIATOR INLET VALVE
Filed Feb. 23, 1935　　　　2 Sheets-Sheet 1
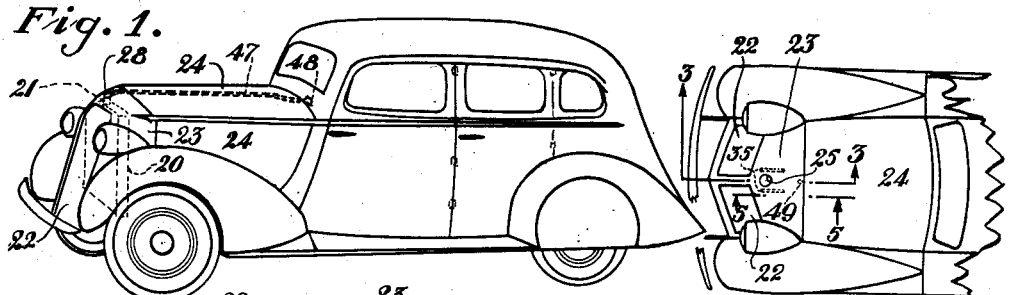
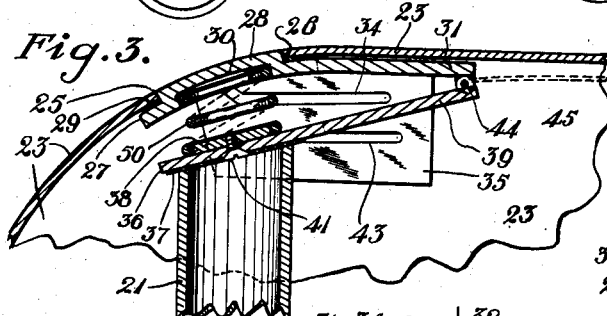
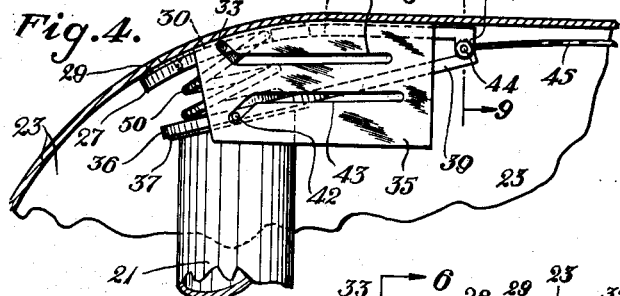
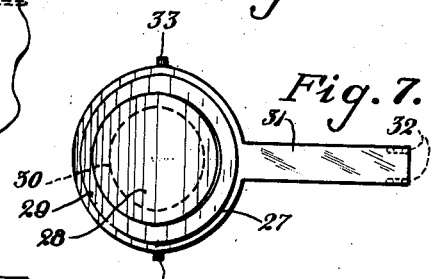
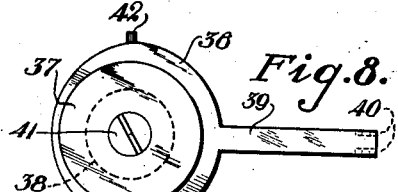
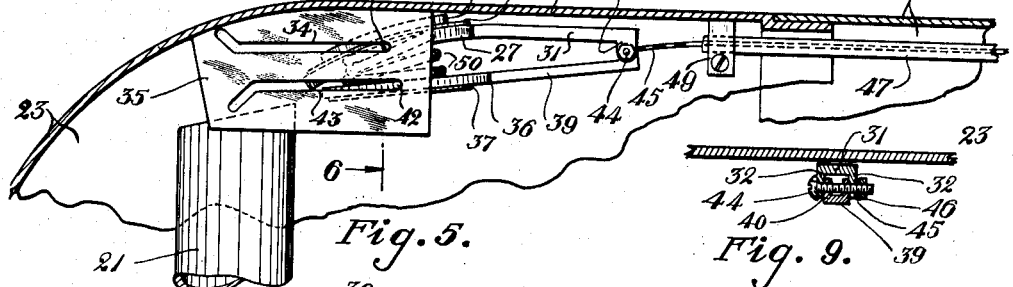
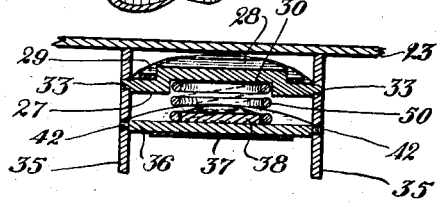
INVENTOR.
BERNET FRIEDMAN
BY
Richard S. Temko
ATTORNEY.

May 23, 1939.  B. FRIEDMAN  2,159,477
AUTOMOBILE RADIATOR INLET VALVE
Filed Feb. 23, 1935  2 Sheets-Sheet 2
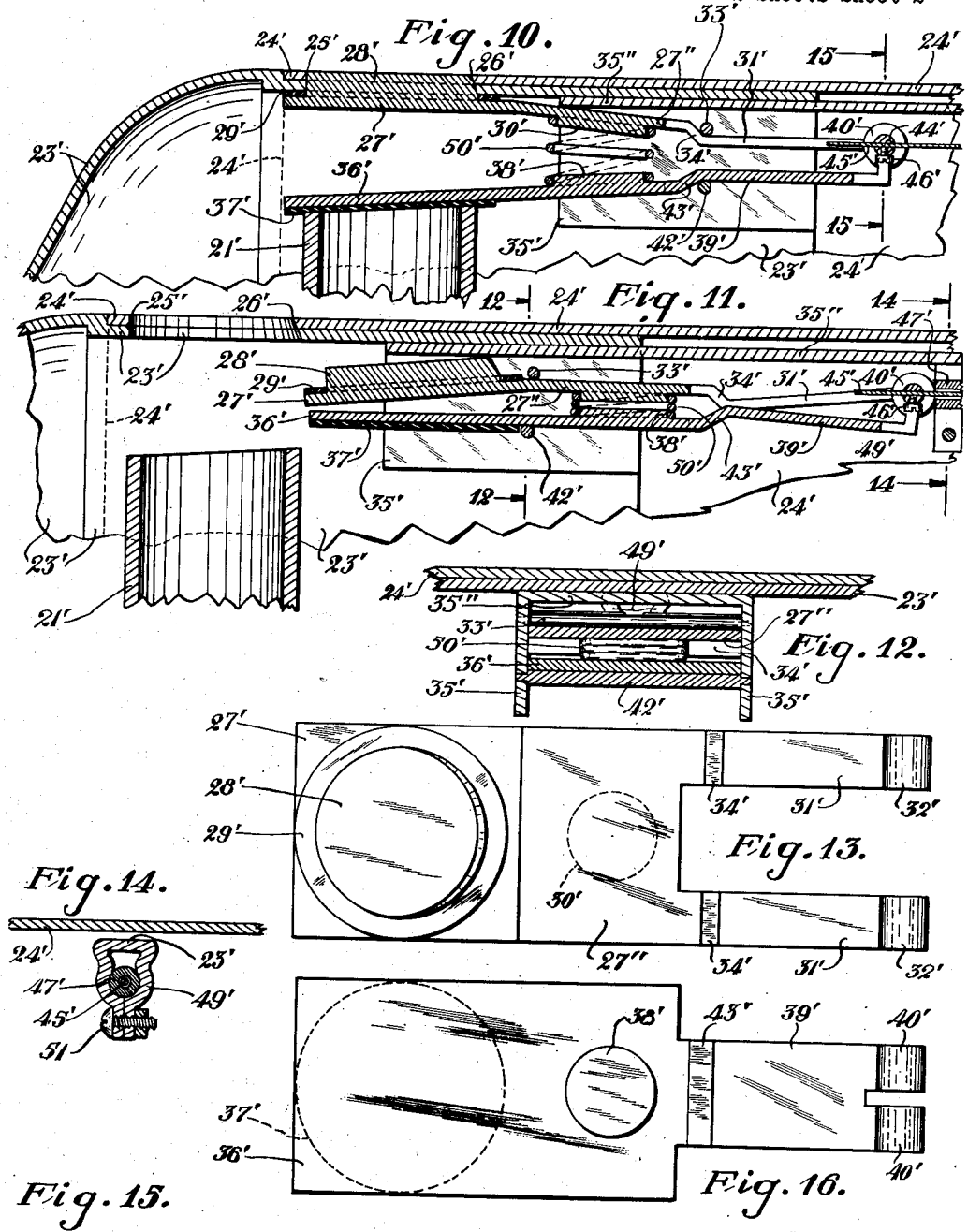
INVENTOR.
BERNET FRIEDMAN
BY
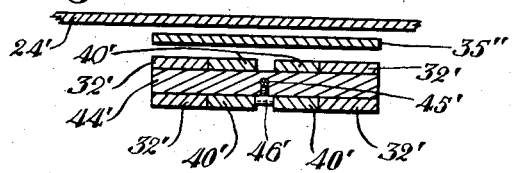
ATTORNEY.

Patented May 23, 1939

2,159,477

UNITED STATES PATENT OFFICE 2,159,477

AUTOMOBILE RADIATOR INLET VALVE

Bernet Friedman, South Norwalk, Conn.

Application February 23, 1935, Serial No. 7,869

15 Claims. (Cl. 220—38)

This invention relates generally to automobile radiator caps, and more particularly to automobile radiator inlet valves having concealed and remotely controlled operating mechanism.

With the advent of stream-lining as applied to the bodies of automobiles and the consequent desire to make the radiator shell, motor hood, and cowl one smooth surface having reduced airflow resistance, the radiator inlet pipe has ceased to project through the shell and terminate in a conventional cap. As a result, it has become necessary to raise the hood or bonnet to inspect the level or condition of liquid, such as antifreeze solution or water, or replenish same within the radiator. Especially is this noticed where the liquids are poured from containers rather than discharged from a hose; the forward, dark and inaccessible location of the filler inlet making for sloppage, and damage of adjacent finished surfaces. This inconvenience naturally gives rise to neglect, subsequently resulting in damage to the motor due to improper cooling.

The main object of this invention is the provision of structure whereby the foregoing objections are overcome, allowing the radiator to be inspected and replenished without raising the hood, yet still preserving the smooth stream-line of shell and hood.

Another object of the invention is the provision of a radiator capping device which is controlled from the dash or instrument board and, having no removable parts comparable to the conventional exterior cap, is not as liable to theft.

Further features of this invention are: lightness, compactness, absence of rattling, easy replacement of parts subject to wear, and economy of manufacture, since most of the parts may be made of stampings from sheet metal stock.

These objects and other incidental ends and advantages will more fully appear in the following disclosure and as pointed out in the appended claims.

In the accompanying drawings showing two preferred embodiments of the invention, similar reference characters designate corresponding parts throughout the several views of each embodiment. In the drawings:

Figure 1 is a view in perspective of a streamlined automobile showing in dotted lines the general position of the invention as applied thereon.

Figure 2 is a fragmentary plan view of the forward portion of Figure 1.

Figure 3 is an enlarged fragmentary medial longitudinal vertical section of the first preferred embodiment of the invention taken along the line 3—3 of Figure 2.

Figure 4 is an enlarged fragmentary vertical section of Figure 2 along the line 4—4 thereof showing the invention in elevation and with the movable assembly thereof in its closed position.

Figure 5 is a view similar to Figure 4 except that it shows the invention in its open position and also the clamping means for the remote control.

Figure 6 is a fragmentary vertical transverse section of Figure 5 along the line 6—6 thereof.

Figure 7 is a plan view of the top side of the exterior closure member of the first preferred embodiment of the invention.

Figure 8 is a plan view of the underside of the radiator inlet valve plate of the first embodiment of the invention.

Figure 9 is a fragmentary vertical transverse section of Figure 4 along the line 9—9 thereof.

Figure 10 is a fragmentary medial longitudinal vertical section of an alternative preferred embodiment of the invention showing the device in its closed position.

Figure 11 is a view similar to Figure 10 except that it shows the device in its opened position.

Figure 12 is a fragmentary vertical transverse section of Figure 11 along the line 12—12 thereof.

Figure 13 is a plan view of the top side of the exterior closure member of the alternative embodiment in Figure 10.

Figure 14 is a fragmentary sectional view of Figure 11 along the line 14—14 thereof.

Figure 15 is a fragmentary sectional view of Figure 10 along the line 15—15 thereof.

Figure 16 is a plan view of the top side of the radiator inlet valve plate of the alternative embodiment shown in Figure 10.

In the embodiment of the invention shown in Figures 1 to 9 inclusive the device is applied to an automotive vehicle wherein the radiator 20, having an inlet filler pipe 21 communicating with the upper tank thereof, is enclosed by a grill 22, an outer shell 23 and a motor hood 24. Shell 23 is provided with an orifice 25 opposite and above the upper opening of inlet pipe 21, the rear edge of said orifice being slightly beveled rearwardly and downwardly toward the under surface of shell 23 as indicated by numeral 26 on Figure 3.

A disc shaped exterior closure member 27 is comprised of: a raised disc portion 28 on the upper surface thereof, an anular resilient gasket 29 surrounding the base of said disc portion 28, a shallow cylindrical recess 30 in the under surface thereof, an integral radial arm extending rearwardly, and downwardly bent orificed ears 32 extending perpendicularly from the sides of said arm at the rear terminal thereof. Member 27 is curved to conform to the shape of the inside of shell 23 adjacent thereto and disc portion 28 is suitably shaped to coincide in height and exterior surface with the exterior edge of the orifice 25 so that the outer surface of disc portion 28 and the outer surface of shell 23 abutting thereat constitute one co-extensive surface when said disc portion 28 and orifice 25 are in engagement.

Member 27 is slideably trunnioned between a pair of spaced parallel plates 35 by two diametrically opposed pins 33 laterally projecting from the periphery of said member 27. Pins 33 ride in slots 34 in plates 35, said plates being longitudinally disposed and vertically depending from shell 23 at either side of orifice 25. Plates 35 are suitably affixed thereat, for example, by welding, their position being shown by dotted lines in Figure 2. The forward portions of slots 34 curve upwardly and as guideways serve to transform simple horizontal longitudinal motion of ears 32 into motion of member 27 having both horizontal and vertical components.

A disc shaped valve plate 36 is comprised of a resilient facing disc 37, a boss 38, an integral radial arm 39 extending rearwardly, and upwardly bent orificed ears 40 extending perpendicularly from the sides of said arm at the rear terminal thereof. Disc 37 and boss 38 are concentrically mounted upon the upper and lower surfaces respectively of plate 36 by means of a screw 41 co-axially penetrating disc 37, plate 36, and boss 38, threadedly engaging the latter.

Valve plate 36 is slideably trunnioned between plates 35 by diametrically opposed pins 42 laterally projecting from the periphery of said plate 36. Pins 42 ride in slots 43 which are in plates 35 below slots 34. The forward portions of slots 43 curve downwardly and serve as guideways similarly to slots 34 with relation to member 27.

Ears 40 are nested between ears 32 so that a screw 44 penetrating the aligned orifices therein serves to pivotally inter-connect arms 39 and 31. A piano wire 45 is attached to this last mentioned assembly in any suitable manner as by winding said wire about screw 44 and clamping it against one of the ears 32 with a nut on the end of screw 44. Wire 45 continues rearwardly within a sheath 47 therefor and terminates in attachment to any suitable control 48 known in the art for longitudinally reciprocating said wire. Sheath 47 is supported at one or more points along its travel, not shown in the drawings, but its foremost support is a clamp-bracket 49 which depends from shell 23 adjacent the rear edge thereof.

A helical expansive spring 50, retained by encircling boss 38 with its lowest coil and by engaging recess 30 causes closure member 27 and valve plate 36 to constantly repel each other. It may now be seen that spring 50 maintains closure member 27 (in its closed position) snugly against shell 23, compressing gasket 29 therebetween forming a water-tight seal and said spring also maintains valve plate 36 (in its closed position) against the upper edge of inlet pipe 21, compressing disc 37 therebetween and forming another watertight seal. The pressure under which these aforementioned seals are maintained is dependent solely upon the compression or conversely, the expansive power of spring 50, because slots 34 and 43 are continued beyond the points where pins 33 and 42 respectively, come to rest when limited by the contact of member 27 against shell 23 and plate 36 against inlet pipe 21.

To open the device so that the radiator may be filled or inspected, wire 45 is displaced rearwardly, thereby causing pins 33 and 42 to bear against the inclined edges of slots 34 and 43 respectively. The resulting cam action disengages member 27 from the orifice 25 in shell 23 and disengages plate 36 out of contact with inlet pipe 21. The movable assembly now collapsed is retracted sufficiently to leave an unobstructed passage between opening 25 and inlet pipe 21. During the simple rearward movement of the movable assembly, pins 33 and 42 ride along the parallel portions of slots 34 and 43 respectively. To open the device, wire 45 is moved forwardly, and the exact reverse of the action just described above, takes place. It is to be noted at this point that spring 50 may be omitted without showing an inoperative structure, if provision is made for suitably locking, in its most forward position, the movable assembly. In which case pins 33 bear against the lower curved edges of slot 34 while pins 42 bear against the upper curved edges of slots 43. Also, while the upper end of pipe 21 is shown as obliquely cut off, this is deemed expedient and this angle of cut-off may be changed by suitably altering the angle, plate 37 occupies, in its closed position.

In the second preferred embodiment illustrated in Figures 10 to 16 inclusive, the invention is shown applied to an automobile in which the hood 24' extends forwardly to over-lap the radiator shell 23' for an appreciable portion thereof. This structure (i. e. over-lapping) is used where it is desired to reduce the amount of the radiator shell which is visible from the exterior. It will also be seen in the second embodiment how the invention may be applied to the hood and radiator shell adjacent a relatively flat portion thereof, but it is understood that either of the embodiments described may be applied to flat or curved adjacent surfaces.

The radiator shell 23' and hood 24' having registering orifices therein, as indicated at 25' in Fig. 11, superpose a radiator inlet filler pipe 21'. The openings in shell 23' and hood 24', at the rear edges thereof are slightly beveled in a rearward and downward direction as indicated by numeral 26'.

A rectangular exterior closure member 27' is comprised of an elevated disc portion 28' on the upper surface and adjacent the forward end thereof, an annular resilient gasket 29' surrounding the base of disc portion 28', a boss 30' intermediate the length and on the under surface thereof, and a bifurcated rear portion terminating in a pair of transversely orificed knuckles 32'. Member 27' at the forward portion thereof, is shaped to conform with the under surface of shell 23' adjacent thereto, while disc portion 28' is of a shape suitable to have the upper surface of said disc form a flush engagement with the orifices in shell 23' and hood 24'. The rear bifurcated portion of member 27' is in a plane parallel and below the forward portion thereof, while the intermediate portion of said member is composed of a large planar surface 27'' downwardly bent at a slight angle and a pair of small planar surfaces 34' downwardly bent at a greater angle. The irregular shape of member 27' is best seen in the section thereof in Figure 10.

Member 27' is slideably mounted between a pair of longitudinal, parallel spaced plates 35', while the upper surface of member 27' bears against a roller 33' transversely trunnioned between said plates 35'. Plates 35' depend perpendicularly from the sides of the forward portion of a rectangular mounting plate 35'' which is suitably affixed, as by welding, to the under surface of shell 23' adjacent the rear edge of said shell.

The inclination of the surfaces 34' and 27'' of the intermediate portion of member 27' serves as a cam surface reacting with roller 33' to transform simple horizontal longitudinal motion of knuckles 32' into motion of member 27' having both horizontal and vertical components.

A rectangular valve plate 36' superposing pipe 21' is comprised of a resilient facing disc 37' suitably affixed to the under surface adjacent the forward end thereof, a boss 38' intermediate the length and on the upper surface thereof, and a narrowed portion terminating in a pair of upwardly projecting transversely orificed knuckles 40'. Approximately the forward half of valve plate 36' is planar while numerals 43' and 39' designate upwardly and downwardly offset planar portions respectively, of the rear portion of plate 36'.

Valve plate 36' is slideably mounted between plates 35' while the lower surface thereof bears against a roller 42' transversely trunnioned between plates 35'. The inclination of offset portion 43' and forward planar portion of plate 36' acts as a cam surface with relation to roller 42' so as to raise and lower plate 36' when it is displaced horizontally.

Knuckles 40' are nested between knuckles 32' so that a pintle 44' penetrating the aligned orifices therein serves to pivotally interconnect member 27' and plate 36'. Pintle 44' is medially and transversely orificed to receive a piano wire 45' which is locked in place by the set screw 46'. Screw 46' forming a projection on pintle 44' between knuckles 40' prevents lateral displacement of said pintle. Wire 45' continuing rearwardly within a sheath 47' when longitudinally reciprocated controls the device. Sheath 47' is anchored at its forward end within a clamp 49' which is formed integrally from the rearmost portion of plate 35'' by downwardly bending two lugs therefrom and compressing said lugs about sheath 47' by a bolt and nut 51 penetrating therethrough.

A helical expansive spring 50' retained concentrically between bosses 30' and 38' maintains member 27' and plate 36' in operative position.

The general action of the movable elements of the second preferred embodiment is identical with that of the first preferred embodiment set forth above. When wire 45' is pulled rearwardly, member 27' and plate 36' are drawn together to disengage orifice 25' and inlet pipe 21' respectively, and then retracted to allow an unobstructed passage through the exterior surface to the inlet of the radiator. When wire 45' is then moved forwardly the displaced parts return to their original closed position and due to the relatively acute angles of surfaces 34' and 36' the movable elements snap back into place with a positive action.

Since the upper surfaces of raised disc portions 28' and 28 are subject to no abrasion when moved, they may be plated or otherwise finished to harmonize with or match the exterior surfaces of shells 23' and 23, or hoods 24' and 24 respectively, thus making the structure practically invisible when closed. Nor would it be beyond the scope of this invention to provide any sort of projection upon the upper surface of disc portions 28' or 28 for decorative purposes and then to alter the parts of the device to accommodate the increased clearances required. While shown disposed centrally of the radiator shell, the device, where desired, may be shifted laterally in its placement, without reducing its efficiency, and then a narrow dummy radiator cap may be used, which has either low wind resistance or aesthetic appeal.

The configuration of the cam surfaces on member 27' and plate 36', or of slots 34 and 43 is dependent upon the clearances and the direction of travel of the movable assemblies found desirable, which will in turn be governed by the shape and/or type of shell or hood on the motor vehicle to which the invention is being adapted. Another factor in this design will be the amount of clearance desired between the port through the exterior surface and radiator inlet, all of which may be accommodated by changing the size and shape of the parts without departing from the general principle thereof.

As shown the invention is affixed to the radiator shell, so that the radiator core and tanks may be easily removed for repair or replacement without disturbing the inlet valving mechanism. The device may however, be supported on the radiator inlet, radiator tank, or the motor hood, with equal operativeness.

It is understood that minor changes and variations in the location, structure and material of the several parts may be resorted to without departing from the scope of the appended claims.

I claim:

1. An automobile radiator inlet valve comprising: a radiator having an inlet thereto, a spaced outer surface having an orifice therein, an exterior closure member adapted to engage said orifice, a valve plate adapted to engage said inlet, and means to displace said plate and to displace said member inwardly to a position of disengagement.

2. An automobile radiator inlet valve comprising: a radiator having an inlet thereto, a spaced outer surface having an orifice therein, an exterior closure member adapted to engage said orifice, a valve plate adapted to engage said inlet, means to shift said plate and to displace said member inwardly to a position of disengagement, and means to retract said plate and member thereby leaving an unobstructed passage through said orifice to said inlet.

3. An automobile radiator inlet valve comprising a radiator having an inlet thereto, a radiator shell or bonnet having an orifice therein, an exterior closure member adapted to engage said orifice, a valve plate adapted to engage said inlet, supporting means for said member and plate including a pair of spaced plates between which the said plate and member are slidably mounted, and means to displace said plate and to displace said member inwardly to a position of disengagement.

4. An automobile radiator inlet valve comprising a radiator having an inlet thereto, a radiator shell or bonnet having an orifice therein, an exterior closure member adapted to engage said orifice, a valve plate adapted to engage said inlet and pivotally connected to said member, supporting means for said member and valve plate including a pair of spaced plates between which the said member and valve plate are slidably mounted, and means to displace said valve plate and to displace said member inwardly to a position of disengagement.

5. An automobile radiator inlet valve comprising: a radiator having an inlet thereto, a spaced outer surface having an orifice therein, an exterior closure member adapted to engage said orifice, a valve plate adapted to engage said inlet, resilient mechanism for forcing the member to engage the orifice and the plate to engage the inlet, and means to displace said plate and to displace said member inwardly to a position of disengagement.

6. An automobile radiator inlet valve comprising a radiator having an inlet thereto, a radiator shell or bonnet having an orifice therein, an exterior closure member adapted to engage said orifice, a valve plate adapted to engage said inlet, resilient mechanism for forcing the member to engage said orifice and the valve plate to engage said inlet, supporting means for said member and valve plate including a pair of spaced plates between which the said valve plate and member are slideably mounted, and means to displace said valve plate and to displace said member inwardly to a position of disengagement.

7. An automobile radiator inlet valve comprising a radiator having an inlet thereto, a radiator shell or bonnet having an orifice therein, an exterior closure member adapted to engage said orifice, a valve plate adapted to engage said inlet and pivotally connected to said member, resilient mechanism for forcing the member to engage the orifice and the plate to engage the inlet, and means to displace said plate and to displace said member inwardly to a position of disengagement.

8. An automobile radiator inlet valve comprising a spaced outer shell or bonnet having an orifice therein, a pair of spaced plates having guideways therein and disposed proximate said orifice, said guideways having at least a portion thereof angularly disposed with relation to said shell and directed upwardly toward said orifice, an exterior closure member slidably trunnioned in said guideways and by reason of the guideways being adapted in one position to engage said orifice, and in another position to lie inwardly of and in a plane below said engaged position thereby affording an unobstructed passage through said orifice.

9. An automobile radiator inlet valve comprising a spaced outer surface having an orifice therein, a roller stationary with relation to said outer surface, an exterior closure member having a cam surface thereon coacting with said roller, said closure member being slideably supported with relation to said outer surface and adapted in one position to engage said orifice and in another position to lie inwardly of and in a plane below said engaged position thereby affording an unobstructed passage through said orifice.

10. An automobile radiator inlet valve comprising a spaced outer surface having an orifice therein, a roller stationary with relation to said outer surface, an exterior closure member having a cam surface thereon coacting with said roller, said closure member being slideably supported with relation to said outer surface, resilient means for forcing said member into engagement with said orifice, said member being adapted in one position to engage said orifice and in another position to lie inwardly of and in a plane below said engaged position thereby affording an unobstructed passage through said orifice.

11. An automobile radiator inlet valve comprising a radiator having an inlet thereto, a radiator shell having an orifice therein, an exterior closure member adapted to engage said orifice and having a cam surface, a valve plate adapted to engage said inlet and having a cam surface, followers for said cam surfaces which are fixed with relation to said shell and which support said member and plate, and means to displace said member and plate to a position of disengagement.

12. An automobile radiator inlet valve comprising a radiator having an inlet thereto, a radiator shell having an orifice therein, an exterior closure member adapted to engage said orifice and having a cam surface, a valve plate adapted to engage said inlet pivotally connected to the member and having a cam surface, followers for said cam surfaces which are fixed with relation to said shell and which support said member and plate, and means to displace said member and plate to a position of disengagement.

13. An automobile radiator inlet valve comprising a radiator having an inlet thereto, a radiator shell having an orifice therein, an exterior closure member adapted to engage said orifice and having a cam surface, a valve plate adapted to engage said inlet and having a cam surface, followers for said cam surfaces which are fixed in relation to said shell and which support said member and plate, resilient mechanism to force said member and plate into the engaged positions thereof and the cam surfaces into operative position with the followers, and means to displace said member and plate to a position of disengagement.

14. An automobile radiator inlet valve comprising a radiator having an inlet thereto, a radiator shell having an orifice therein, an exterior closure member adapted to engage said orifice and having a cam surface, a valve plate pivotally connected to the member and adapted to engage said inlet, a cam surface on said valve plate, followers for said cam surfaces which are fixed in relation to said shell and which support said member and plate, resilient mechanism to force said member and plate into the engaged positions thereof and the cam surfaces into operative position with the followers, and means to displace said member and plate to a position of disengagement.

15. An automobile radiator inlet valve comprising a spaced outer surface having an orifice therein, an element stationary with relation to said outer surface, an exterior closure member having a cam surface coacting with said element, said closure member being slideably supported with relation to said outer surface and adapted in one position to engage said orifice and in another position to lie inwardly of and in a plane below said engaged position thereby affording an unobstructed passage through said orifice.

BERNET FRIEDMAN.